Oct. 30, 1962       R. L. ROCHE ET AL       3,061,532
PILES OF NUCLEAR REACTOR ELEMENTS AND IN PARTICULAR
OF MODERATOR MATERIAL ELEMENTS
Filed Dec. 2, 1957                    3 Sheets-Sheet 1

INVENTORS
ROLAND LOUIS ROCHE
ROGER MARTIN

BY

ATTORNEY

Oct. 30, 1962    R. L. ROCHE ET AL    3,061,532
PILES OF NUCLEAR REACTOR ELEMENTS AND IN PARTICULAR
OF MODERATOR MATERIAL ELEMENTS
Filed Dec. 2, 1957    3 Sheets-Sheet 2

INVENTORS
ROLAND LOUIS ROCHE
ROGER MARTIN

BY *Fritz C. Hirshwald*

ATTORNEY

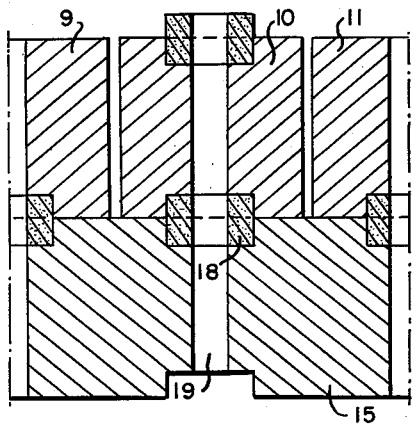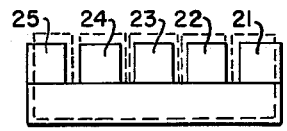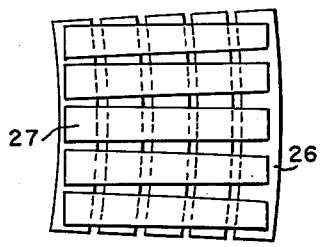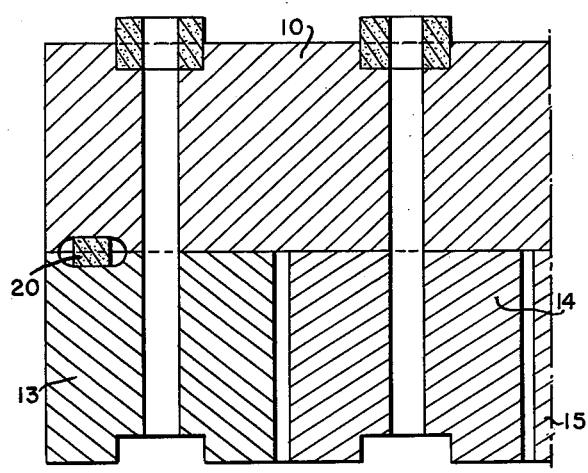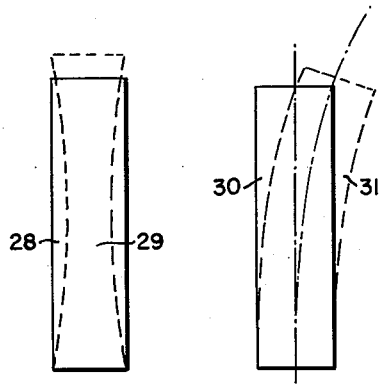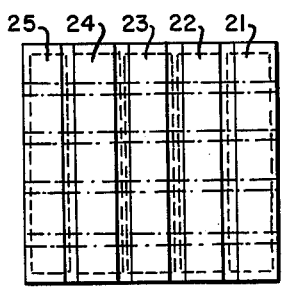

United States Patent Office 3,061,532
Patented Oct. 30, 1962

3,061,532
PILES OF NUCLEAR REACTOR ELEMENTS AND IN PARTICULAR OF MODERATOR MATERIAL ELEMENTS
Roland Louis Roche and Roger Martin, Paris, France, assignors to Commissariat a l'Energie Atomique, Paris, France, a state administration of France
Filed Dec. 2, 1957, Ser. No. 700,146
Claims priority, application France Dec. 3, 1956
2 Claims. (Cl. 204—193.2)

The present invention relates to piles of nuclear reactor elements in the form of prismatic-shaped blocks and in particular of moderator material elements constituting the moderator structure of a nuclear reactor having vertical channels.

The object of our invention is to provide a pile of this kind which is better adapted to meet the requirements of practice than those used up to the present time.

According to our invention, said pile comprises a plurality of vertical columns having flat vertical side walls, said columns being juxtaposed closely to, but out of contact with, one another, each of said columns consisting of a plurality of horizontal layers superimposed and resting on one another, each of said layers consisting of a plurality of said blocks disposed parallel to and at a small distance from one another, the longitudinal direction of the blocks of one layer being transverse, and preferably at right angles to, the longitudinal direction of the blocks of the next layer, each of said blocks being guided with respect to at least one of the blocks of the layer located thereunder by connecting means capable of keeping the longitudinal direction of said two last mentioned blocks at a constant angle to each other without interfering with expansion or contraction of said blocks.

In nuclear reactors having vertical channels and a solid moderator, the active portion in which the chain reactions take place is constituted by a large mass of moderator provided with a multiplicity of vertical channels through which the coolant fluid flows and in which are placed the slugs of fissionable material.

This mass of moderator is constituted by a pile of horizontal elongated blocks having a substantially parallelepipedal shape, the cross-section being practically square and the length being much greater than the width (from three to eight times for instance). These blocks are formed by extrusion of the moderator material.

This pile of moderator material elements constitutes practically the only resistant structure of the core of the reactor and therefore it must have the following mechanical and geometrical properties:

Stability and mechanical resistance;
Continuity of the internal surface of the channels through which the coolant fluid circulates and where the elements of fissionable material are placed, in order to permit a reliable cooling of these elements and also to facilitate the introduction and removal thereof;
Continuity of the internal surface of the other recesses provided in the pile, which serve to house adjustment, control, safety and other apparatus necessary for a good operation of the reactor;
Preservation of these qualities for a sufficient time.

In the particular case of graphite moderated piles, the following difficulties are to be taken into account:

Graphite, when shaped by extrusion, is an anisotropic material the preferential direction of which is that of extrusion (longitudinal direction); in particular, its coefficient of thermal expansion is generally much lower in this direction than in a direction at right angles thereto;

When a nuclear reactor is in operation, a great amount of heat is disengaged in the active section thereof so that graphite is heated to a temperature substantially higher than the temperature of the surrounding atmosphere; when the operation of the pile is stopped, graphite cools down to this external temperature, whereby the pile of moderator material elements undergoes successive heatings and coolings during which the dimensions of the graphite blocks vary in a practically periodical fashion;

When a reactor is in operation, the graphite located in the central portion thereof is subjected to the effect of all nuclear radiations produced in the reactor; some of these radiations, and in particular fast neutrons, produce positive or negative variations of dimensions of the graphite, the expansions thus produced being much greater than those due to the temperature variations; these deformations, known as the "Wigner effect," are also anisotropic and produce, in blocks obtained by extrusion, expansions in the transverse direction and contractions in the longitudinal direction; they differ from one point of the pile to the other and are generally greater at the center than at the periphery.

In known nuclear reactors having vertical channels, the pile of moderator material is generally constituted by a multiplicity of blocks disposed horizontally in superimposed layers, said layers being either parallel or crossed.

When the layers are crossed, each of them is perpendicular to the two layers located respectively over and under it. This arrangement, which gives a good stability, has the drawback of creating high differential expansions due to the anisotropic characteristics of graphite, thus involving the risk of plays which deform the channels and place them in communication with one another whereby it becomes impossible to adjust the flow of coolant fluid.

Furthermore, due to the anisotropic properties of the material and to the variation of thermal expansion from one point to another, the blocks creep with respect to one another, which increases the plays, deforms the channels and may ruin the graphite structure. It is therefore necessary to introduce means for preventing this relative displacement of the blocks with respect to one another. Such means may be either of the type making use of external forces, or of the type making use of positive connections between the blocks. As a matter of fact, such means are extremely difficult to obtain in actual practice.

When the blocks of the superimposed layers are parallel from one layer to the next one, the difficulties due to the anisotropic properties of graphite are indeed eliminated, but the pile is not stable by itself and it is practically possible to fix the blocks with respect to one another. It is then necessary to make use of external forces. These external forces, which may be supplied by springs, must have characteristics close to those of a hydrostatic thrust, that is to say substantially equal in the three directions corresponding to the three dimensions of space. The operation of such a mechanism, which is generally highly complicated, cannot be safe in view of the high friction coefficients which may occur between two graphite blocks, since friction may oppose the action of the external forces and nullify their effect.

In order to obviate these drawbacks, according to our invention, the pile comprises a plurality of vertical columns having flat vertical side walls, said columns being juxtaposed closely to, but out of contact with, one another, each of said columns consisting of a plurality of horizontal layers superimposed and resting on one another, each of said layers consisting of a plurality of said blocks disposed parallel to and at a small distance from one another, the longitudinal direction of the blocks of one layer being tranverse, and preferably at right angles, to the longitudinal direction of the blocks of the next layer, each of said blocks being guided with respect to at least one of the blocks of the layer located thereunder by isostatic connecting means.

The term "isostatic connecting means" applies to connecting means which permit of controlling exactly the angular position of the element that is being considered, without introducing any unnecessary connection which might produce a stress and an undesirable deformation. In other words, the whole is correctly kept in position without its deformations, and in particular those due to the Wigner effect and to the thermal effect, being prevented.

For instance, each of the graphite blocks is pivotally connected about a vertical axis with one block of the layer immediately thereunder, and each of said blocks is furthermore slidably guided along a horizontal line with respect to one block of said layer located immediately thereunder.

The blocks of the lowermost layer of each column are connected in a similar manner to a strong plate serving to support the column.

The arrangement according to our invention permits of placing the moderator unit on a supporting platform which is slightly deformable, provided that the respective plates which support each of said columns are themselves rigid. The fact that the moderator mass is divided into a plurality of columns prevents any accumulation of the deformations in the horizontal direction.

Stability in each column is ensured by the fact that the layers are crossed with respect to one another and by the guiding means interposed between each block and at least one and preferably two blocks of the layer located immediately thereunder.

Such an arrangement ensures a satisfactory continuity of the vertical channels, which facilitates the displacement of the fuel slugs in the channels and eliminates any risk of leakage between channels.

Expansion of the material constituting the blocks (graphite for instance), which is variable from one point to the other of the pile, does not substantially deform the cross-sections of the columns and, in the direction of the axis of these columns, it produces only an elongation and a curvature which remain compatible with a good stability without requiring any connection between two adjoining columns. Furthermore, in view of the fact that there is generally observed a contraction in the direction of length (Wigner effect), the cross-section of the columns will decrease thus preventing any risk of packing of the columns against one another.

Such a piling arrangement is particularly well adapted to the case of piles of moderator material for big graphite moderated reactors, but it may also be used for piling up the moderator material elements of any reactor making use of another moderator material, such for instance as beryllia.

It may also be used for piling up blocks of a material to constitute a reflector for all kinds of reactors (even for heavy water, natural water, and similarly moderated reactors).

In a general manner, the arrangement according to our invention may be used for making piles of nuclear reactor elements made of a material having an anisotropic expansion and which is not homogeneous.

Preferred embodiments of the present invention will be hereinafter described with reference to the accompanying drawings, given merely by way of example and in which:

FIG. 7 shows a portion of FIG. 4 on an enlarged scale.

FIG. 8 is a partial view, on an enlarged scale, on the line VIII—VIII of FIG. 6.

FIG. 9, which is a top plan view of a layer of blocks, and FIG. 10 which is an end view of the same layer, illustrate the deformations of a layer of blocks in a zone where the expansions are distributed in a substantially homogeneous manner.

FIG. 11 illustrates the deformation of a layer of blocks in a zone where the expansions are not distributed in a homogeneous fashion.

FIGS. 12 and 13 show the deformations of a column. FIG. 12 illustrates the deformations of the horizontal cross-sections of the column and the modification of its height and FIG. 13 shows the deformation of the axis of the column. As a matter of fact, these two deformations take place simultaneuosly and are combined with each other.

On FIGS. 9 to 13, the amplitude of the deformations have been deliberately magnified so as to make them visible on the drawings.

Figure 1:
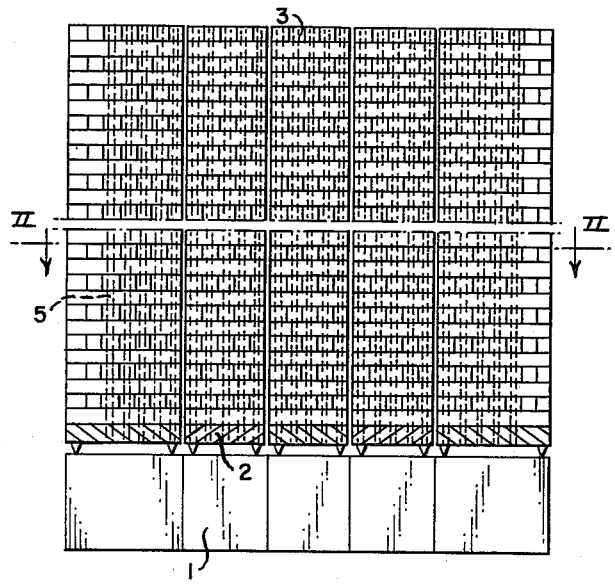
FIG. 1 is a vertical sectional view, on the line I—I of FIG. 2, of the active portion of a nuclear reactor having vertical channels and moderated by means of graphite, the graphite elements being piled up according to the present invention.
Figure 2:
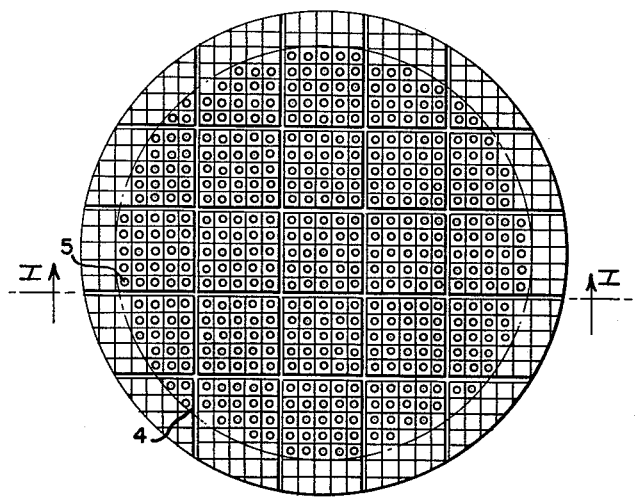
FIG. 2 is a horizontal sectional view of the same reactor on the line II—II of FIG. 1.

On FIG. 1, reference numeral 1 designates the steel floor which supports a plurality of cast iron plates, such as 2, rigid with this floor and each of which supports a graphite column 3. Most of these columns are of square horizontal section, but some of them, which are disposed at the periphery of the graphite system, for instance column 4 (FIG. 2), have a different horizontal section so that the whole of the columns constitutes a cylinder of revolution of vertical axis. Each column contains a plurality of vertical cylindrical channels such as 5, each opening at both ends of the active mass and being located opposite a corresponding orifice in the cast iron plate which supports the column. These channels contain the fissionable material and they constitute conduits for the passage of the coolant fluid.

Figure 3:
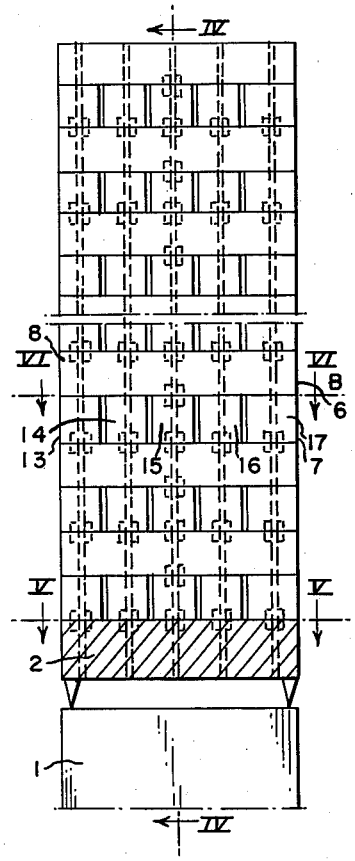
FIG. 3 is an elevational view of one of the columns of graphite blocks of the nuclear reactor of FIG. 1.

Each graphite column is constituted by a multiplicity of layers superimposed on one another, such as 6 and 7 (FIG. 3), each of these layers being itself made, in the example that is illustrated, by five parallel blocks of graphite slightly spaced apart from one another, the distance between two consecutive blocks ranging for instance from 2 to 5 mm. The blocks of a layer are at right angles to those of the layer located immediately thereunder. For instance, as shown by FIG. 4, the blocks 8, 9, 10, 11 and 12 of layer 6 are at right angles to blocks 13, 14, 15, 16 and 17 of layer 7.

The distances between the columns range for instance from 5 to 10 mm. The height of these columns may be of about 10 meters. The blocks that are used have a cross-section of 195 x 200 mm. and a length of 1 m.

Figure 4:
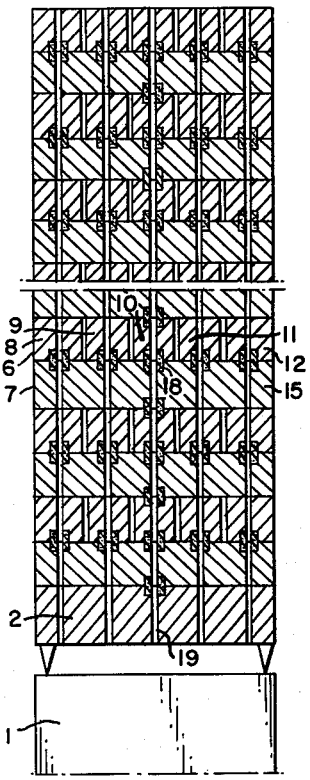
FIG. 4 shows the same column in vertical section on the line IV—IV of FIG. 3.
Figure 5:
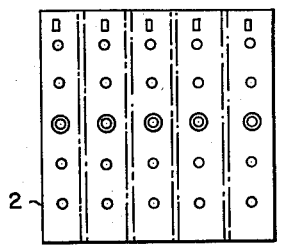
FIGS. 5 and 6 are horizontal sectional views, respectively on the lines V—V and VI—VI of FIG. 3.
Figure 6:
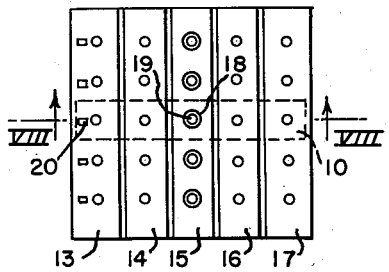

Any block, for instance 10 as shown in dotted lines on FIG. 6, is connected with the central block 15 of the layer 7 located thereunder by pivoting connecting means constituted by a sleeve 18 (FIG. 6) located along the axis of its central channel 19 (FIGS. 4 and 6). Furthermore, said block 10 is connected with block 13 of said layer 7 by a sliding joint 20.

FIG. 7 shows in a detailed manner the assembly of block 10 with the central block 15 of layer 7, through sleeve 18.

FIG. 8 shows the sliding key 20 which guides the end of block 10 with respect to the block 13 of the next layer.

In the embodiment that is described, sleeve 18 and key 20 are made of graphite. However, it is possible to make the sleeves and the keys of other materials which are transparent to neutrons, such for instance as beryllium, zirconium, beryllia, etc.

Fixation of the blocks on the cast iron plate 2 (FIGS. 3 and 4) is analogous to that above described between the graphite layers, the only difference lying in the material of which the sleeve and the key are made, because, to connect the blocks of the lowermost layer with the cast iron supporting plate, it is possible to use steel elements since, at this place of the reactor such pieces need not be transparent to neutrons.

During the operation of the reactor, the pile which constitutes the moderator system undergoes deformations when nuclear chain reactions takes place. These reactions produce an anisotropic expansion, variable from one point to another, and maximum at the center of the pile whereas it is practically negligible at the periphery thereof.

In the zones where the expansions are distributed in substantially homogeneous fashion (FIGS. 9 and 10), the anisotropic properties of graphite lead to a reduction of the intervals between blocks since these blocks expand perpendicularly to their axis and contract parallelly thereto (Wigner effect). Furthermore, the dimensions of a layer of blocks decrease because they are determined by the length of the blocks. FIGS. 9 and 10 illustrate the behaviour of blocks 21, 22, 23, 24 and 25, shown in solid lines before deformation, and in dotted lines after expansion.

In the zones where the expansions are not distributed in homogeneous fashion, and if the flux of neutrons, and therefore the Wigner effect, increases for instance from right to left, the blocks of the lower layer 26 (FIG. 11) undergo, in the longitudinal direction, a contraction which increases from the right toward the left and which gives them curved shapes. On the contrary, in the transverse direction, the blocks of the upper layer 27 undergo an increasing expansion which gives them a trapezium shape, the result of the combination of these two effects being clearly visible on FIG. 11.

FIGS. 12 and 13 illustrate the deformation of a column.

In the zones where the expansions are substantially constant in a plane perpendicular to the axis of the columns, there is produced an elongation of the column and also a slight deformation of hyperbolic shape due to the longitudinal contraction of the blocks. FIG. 12 shows at 29 this deformation of column 28.

In the zones where the expansions are not constant in a plane perpendicular to the axis of the columns, a bending of the axis, shown on FIG. 13 and due to a greater expansion on the left than on the right is combined with the above described effect.

The Wigner effect, which increases from right to left, deforms the initial column 30 which comes into position 31 (FIG. 13). As a rule, the two preceding deformations, illustrated by FIGS. 12 and 13, take place simultaneously and combine their effects together.

The above described deformations go increasing with the life of the reactor, and the duration thereof is therefore limited to the period of time at the end of which one of the following phenomenons takes place:

(a) Disappearance of the inverval between blocks,
(b) Bending of the column axis such that stability thereof is impaired.

Anyway, these effects are produced only after a long time.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. In a nuclear reactor, a pile of elements of anisotropic material each of them in the form of an oblong prism shaped block, said pile comprising a plurality of vertical columns having flat vertical side walls, said columns being juxtaposed closely to, but out of contact with, one another, each of said columns consisting of a plurality of horizontal layers superimposed and resting on one another, each of such layers consisting of a plurality of said blocks disposed horizontally, the blocks of each layer being parallel to and at a small distance from one another, the longitudinal direction of the blocks of one layer being at right angles to the longitudinal direction of the blocks of the next layer, means for pivotally connecting about a vertical axis each of said blocks with respect to only one block of the layer immediately thereunder, and means for slidably guiding each of said blocks with respect to one block of the layer immediately thereunder in only one horizontal direction.

2. In a reactor, a pile according to claim 1 in which said pivotally connecting means include an annular cylindrical member, said two blocks to be connected together being provided with cylindrical recesses in which the respective ends of said member are journalled, said member being made of a material transparent to neutrons.

References Cited in the file of this patent

UNITED STATES PATENTS

| | | |
|---|---|---|
| 1,793,129 | Patton | Feb. 17, 1931 |
| 2,708,656 | Fermi et al. | May 17, 1955 |
| 2,782,158 | Wheeler | Feb. 19, 1957 |
| 2,826,495 | Spedding et al. | Mar. 11, 1958 |
| 2,852,457 | Lon et al. | Sept. 16, 1958 |
| 2,853,440 | Hughes | Sept. 23, 1958 |
| 2,863,815 | Moore et al. | Dec. 9, 1958 |
| 2,864,759 | Long et al. | Dec. 16, 1958 |

FOREIGN PATENTS

| | | |
|---|---|---|
| 782,922 | Great Britain | Sept. 18, 1957 |
| 784,292 | Great Britain | Oct. 9, 1957 |